United States Patent Office 3,459,635
Patented Aug. 5, 1969

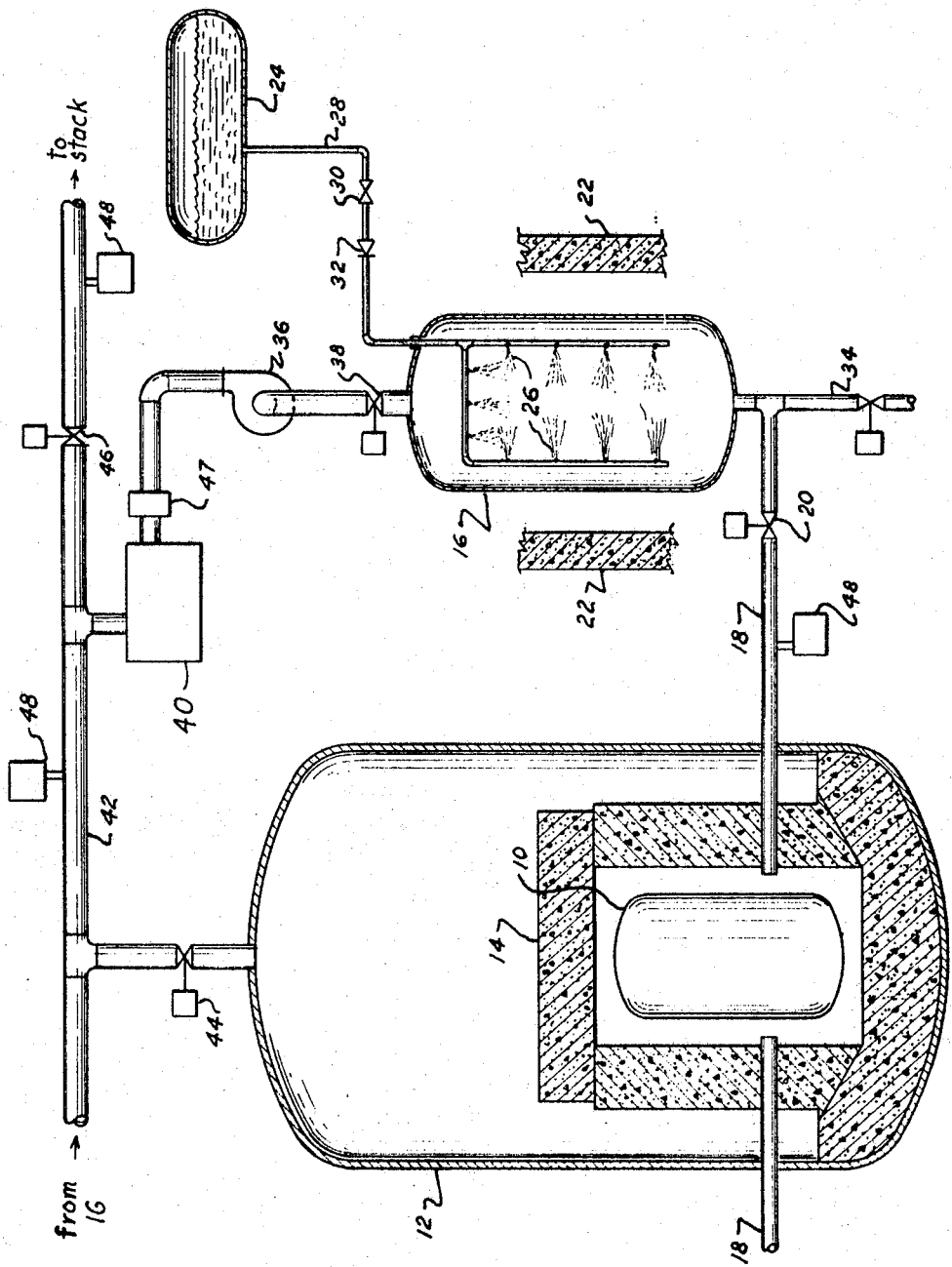

3,459,635
CONTAINMENT PRESSURE REDUCTION SYSTEM AND RADIOACTIVITY REMOVAL SYSTEM FOR NUCLEAR REACTOR INSTALLATIONS
Frank Bevilacqua, Windsor, and John M. West, West Hartford, Conn., assignors to Combustion Engineering, Inc., Windsor, Conn., a corporation of Delaware
Filed Dec. 29, 1966, Ser. No. 606,511
Int. Cl. G21c 19/20
U.S. Cl. 176—37        9 Claims

ABSTRACT OF THE DISCLOSURE

A system for reducing the pressure in the containment facilities for a water type nuclear reactor organization and for removing radioactivity from the containment atmosphere including a plurality of containers which normally form a part of the containment facility for the reactor but which may be separately isolated from the reactor. These containers have a spray type condensing system and by means of the isolation this system can be periodically tested for operability. These containers may also form part of a circulating system which contains purification components to remove radioactivity from the circulated atmosphere and may incorporate other cooling systems, such as heat exchangers, to continue depressurization of the circulating atmosphere.

BACKGROUND OF THE INVENTION

Power generating systems utilizing water type nuclear reactors require containment facilities the function of which is to contain the radioactive products emanating from the reactor due to the occurrence of an accident associated with the primary reactor system. Such an accident may release radioactive material from the system and permit the high pressure, high temperature water to flash into vapor. The containment facilities must be designed to withstand the pressure and temperature resulting from a maximum hypothetical accident whereby virtually all of the thermal energy in the high pressure, high temperature coolant is released, generating large quantities of vapor. In the event of such an incident the pressure will rise in the containment facility, and the facility is required to be designed to withstand this internal pressure. The amount of escape of radioactive products from the containment facility is a function of the pressure in the containment facility, the amount of radioactivity in the fluid and the possible leakage paths from the containment facility. Optimum engineering safeguards may be provided by decreasing the pressure in the containment facility as rapidly as possible after an accident and further by removing radioactivity from the fluid in the containment facility whereby the possibility of escape of radioactive material from the containment is reduced to a minium.

The present invention is effective to achieve these results in an efficient and expeditious manner.

BRIEF DESCRIPTION

The improved containment facilities of the invention include a sizeable containment vessel which houses the primary reactor system together with its shielding. Additionally there are provided one or a plurality of separate containers which are preferably positioned about the containment vessel and which communicate with the interior of this vessel such that in the event of an accident whereupon large quantities of vapor are produced this vapor will be dispersed throughout the containment vessel and these several separate containers. A condensing system is provided for each of the separate containers, and this system preferably includes means for spraying water directly into the containers in order to condense the vapor therein and rapidly reduce the pressure throughout the entire containment facility to reduce the possibility of escape of radioactive material from this facility; or the system includes a heat exchanger system to accomplish the condensing and cooling action. The containers are so arranged that each may be individually isolated from communication with the containment vessel and a drain is provided for each thereby allowing the condensing system to be periodically checked for operativeness. There is additionally provided a circulating system whereby the atmosphere in the containment facility may be circulated through purification equipment. This circulating system includes suitable pump means that are connected with the separate containers and additionally with the large containment vessel and by means of the circulating system the atmosphere in the containment facility may be purified and filtered to reduce the radioactivity level to such a value that it may be vented to atmosphere. Monitors are provided to indicate the level of radioactivity of the atmosphere being circulated through the containment facility. The pressure in the containment facility may be still further reduced during the circulating of the containment atmosphere by cooling this atmosphere, and this cooling may be effected either by the spray equipment in the separate containers or by the special cooling facilities incorporated into the circulating system.

BRIEF DESCRIPTION OF DRAWING

The single figure is in the nature of a diagrammatic representation of a nuclear reactor power plant employing the improved containment facility of the invention.

DETAILED DESCRIPTION OF THE PREFERRED EMBODIMENT

Referring now to the drawing, wherein like reference characters are used throughout to designate like elements, the preferred embodiment depicted therein includes a water type nuclear reactor designated generally 10 and including a pressure vessel housing a reactor core and control means therefor with there being provided the conventional facilities for conveying water to the reactor and steam and/or water from the reactor. The reactor is positioned within a containment vessel or housing 12 which forms part of the containment facility, and as is conventional suitable shielding 14 is disposed about the reactor.

In accordance with the invention there is provided a number of containers 16 which may be positioned either within the vessel 12 or exteriorily of the vessel with this latter arrangement being illustrated in the preferred embodiment of the drawing. These containers communicate with the interior of vessel 12 through the conduit 18 and there is provided in this conduit a normally open isolation valve 20. There are preferably provided two or more such containers 16 so as to give the desired capacity for rapidly reducing the pressure in the containment facility.

Each of the containers 16 is normally opened directly to the interior of the container 12 and in the illustrative embodiment the conduit 18 communicates with the area defined by the shielding 14.

With the containers 16 located exteriorily of the vessel 12 there is provided suitable shielding 22 as desired. It will be understood that such shielding will be utilized whenever necessary and in the quantity required for insuring non-hazardous conditions.

In addition to providing a portion of the volume of the containment system, the containers 16 form part of a condensing system for condensing the steam produced incident to an accident and thereby rapidly reducing the pressure in the containment facility. It will be understood that if this pressure can be reduced to atmosphere, the chance of leakage of radioactive fluid from the containment facility is greatly reduced and if the pressure can be reduced below atmosphere, the chance of leakage of radioactive fluid from the containment facility is eliminated.

Condensing of the vapor produced incident to an accident is effected by introducing into the vessel 16 a condensing medium. The simplest way of doing this is to spray water in the form of a fine mist or fog into the vapor that collects in the container 16. In the illustrative arrangement this is effected by conducting water from the elevated storage tank 24 to spray nozzles 26 in vessel 16. This water is conducted through conduit 28 within which is placed the motor-operated control valve 30 and the check valve 32. The control valve 30 may be operated automatically in response to the build-up of pressure in the vessel 12 incident to rupture of the reactor pressure vessel or other equipment releasing steam into vessel 12 or the valve 30 may be operated through other automatic control means responsive to such an accident or by manual manipulation. Opening of the valve 30 admits water into vessel 16 through the spray nozzles 26 thereby condensing vapor in this vessel. This will reduce the pressure in the container and accordingly cause additional vapor to be conveyed to the container. The ultimate result of this operation will be to rapidly reduce the pressure in the entire containment facility and with this system this pressure may be reduced close to what it was prior to any accident, i.e., close to atmospheric. In the illustrative and preferred arrangement the conduits 18 slope downward from the containers 16 to the region of the reactor within the vessel 12. Thus the condensing water, during operation of the device to condense vapor in the container 16, may drain from the container 16 to the region of the reactor to aid in cooling the reactor core.

The operation of this condensing system may be periodically tested by closing the isolation valve 20 and opening valve 30 such that proper operation of the equipment may be verified under actual operating conditions. For this testing purpose a drain 34 with valve 35 is provided to drain the water thus admitted into the container 16. This condensing arrangement is in contrast to known arrangements wherein sprays are provided in the large containment vessel and where it was impossible to provide a test using the condensing medium because of the facilities that would be damaged upon being subjected to such medium.

In order to remove radioactive products from the atmosphere within the containment facilities after an accident, there is provided a circulating system by means of which this atmosphere may be circulated through filtering and purifying means. This purifying system includes pump 36 which has its inlet connected with the upper end of container 16 through valve 38 and which has its outlet communicating with the upper end of containment vessel 12 through the filtering and purifying means 40, duct 42 and valve 44. It will be understood that each of the containers 16 is provided with such a circulating system or is connected into one or more common circulating systems.

Thus upon opening valves 38 and 44 the atmosphere within the containment facility may be circulated through the filtering and purifying means such that the radioactivity of the atmosphere may be very substantially reduced and finally reduced to such a value that it may be vented to atmosphere with the conduit 42 being connected with a suitable stack through the valve 46. The filtering and purifying means 40 may be comprised of and include conventional systems and equipment for removing radioactive material from gases.

In order to still further reduce the pressure within the containment facility, there may be provided in the circulating system a heat exchanger 47 which will reduce the temperature of the atmosphere. It will thus be possible by thus reducing the temperature to lower the pressure to a value slightly below atmosphere. This heat exchanger may, for example, take the form of a refrigerating system. In this connection the spray from the nozzles 26 may also be utilized during recirculation of the atmosphere through the system to reduce the temperature and accordingly the pressure.

It is noted that the water storage tank should be elevated a sufficient height to insure the injection of water through the nozzles 26 notwithstanding the maximum anticipated rise in pressure in the container 16. If desired a pump may be provided in the line 28 whereby an elevated tank would not be necessary. It is further noted that the spray system may be continually operated such that water is continually drained from the container 16 and returned via a pump to tank 24. This would require that conduit 18 have a downwardly directed portion at its connection with drain 34 so that water draining from container 16 would not be conveyed through conduit 18 to the reactor.

In lieu of condensing the vapor in container 16 by means of a spray, other suitable condensing arrangements may be utilized although a spray is an extremely effective and uncomplicated means for obtaining the desired condensing action.

The radioactivity in the atmosphere of the containment facility may be continually monitored by the monitoring devices 48 so as to determine when the atmosphere may safely be released to atmosphere through a suitable stack by opening valve 46.

These facilities for circulating radioactive atmosphere and for reducing the pressure in the containment facility of a nuclear reactor are particularly well adapted for incorporation into a multi-reactor power plant installation wherein the container 16 may be connected with more than a single reactor containment vessel thereby providing an economical arrangement for effecting the desired results as explained hereinbefore.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail outselves of such changes as fall within the purview of our invention.

What is claimed is:

1. A nuclear reactor system comprising in combination a water cooled nuclear reactor contained in a pressure vessel, a containment vessel within which said reactor is disposed, separate container means communicating with said containment vessel to receive vapor therefrom, normally open valve means interposed between said container means and said containment vessel whereby the container means may be isolated from the containment vessel, drain means for said container means, a source of condensing medium, and means for condensing vapor within said container means including spraying means spraying said condensing medium into the containers, means for temporarily closing said valve means, means for temporarily operating said spraying means while said valve means is temporarily closed, thereby isolating said separate container means from said containment vessel to avoid intrusion of said condensing medium into said containment vessel while testing said spraying means.

2. The reactor system of claim 1 wherein there are a plurality of said separate container means connected with the containment vessel and further where there are a plurality of water cooled reactors connected with the separate container means.

3. The containment pressure reducing system for a water cooled nuclear reactor comprising in combination a source of vaporizable fluid adapted to flash into a vapor, a containment vessel within which said source is disposed, separate container means communicating with said vessel to receive vapor therefrom, valve means interposed between said container means and said vessel whereby the container means may be isolated from the vessel, drain means for said container means, a source of condensing medium, means for condensing vapor within said container means including means spraying said condensing medium into the containers, means for withdrawing gas from the containers and conveying the same back to the vessel including a pump, valve means intermediate the pump and the container and a filtering means for filtering radioactive material from said gas.

4. The system of claim 3 including means for cooling the circulating atmosphere.

5. The combination comprising a containment vessel adapted to house a nuclear reactor which contains a pressurized heated liquid, a plurality of separate containers positioned about said vessel and communicating with the vessel, a spray type cooling system associated with each of said containers and including a source of cooling fluid and means for conducting said cooling fluid from said source to said vessel and spray the same thereinto, valve means controlling the supply of cooling fluid from said source to said container, normally open valve means in communication between the container and said vessel, drain means for draining fluid from said container and means operative to open the first mentioned valve means when the pressure in said vessel rises to a predetermined value.

6. The combination of claim 5 wherein said containers communicate with said vessel at their lower region with this communication being such as to provide for drainage of fluid from said containers into said vessel.

7. The combination of claim 5 wherein said source of cooling fluid is elevated above the containers.

8. The system of claim 5 including a radioactive removal system operative to remove gases from said containers and including a pump communicating with the upper region of said container, a control valve in such communication and filter means effective to filter radioactive constituents from the gases removed from the container by said pump.

9. The combination of claim 8 wherein said removal system includes means to circulate gas through the vessel and containers and wherein means are provided to cool the circulated gases.

References Cited

UNITED STATES PATENTS

| 3,056,736 | 10/1962 | Went et al. | 176—37 |
| 3,105,028 | 9/1963 | Long | 176—37 |
| 3,113,915 | 12/1963 | Webb et al. | 176—37 |
| 3,155,595 | 11/1964 | Schluderberg. | |
| 3,205,145 | 9/1965 | Margen. | |
| 3,232,843 | 2/1966 | Went et al. | 176—38 |
| 3,258,403 | 6/1966 | Malay | 176—37 |
| 3,322,141 | 5/1967 | Gans et al. | 176—38 |

FOREIGN PATENTS

| 909,193 | 10/1962 | Great Britain. |

BENJAMIN R. PADGETT, Primary Examiner

H. E. BEHREND, Assistant Examiner

U.S. Cl. X.R.

176—52